(12) United States Patent
Huang et al.

(10) Patent No.: US 8,139,286 B2
(45) Date of Patent: Mar. 20, 2012

(54) SELF-ADAPTING FEED FORWARD CONTROL APPARATUS AND METHOD IN AN OPTICAL AMPLIFIER

(75) Inventors: Bichang Huang, Shenzhen (CN); Aihua Yu, Shenzhen (CN)

(73) Assignee: O-Net Communications Limited, Shenzhen (CN)

( * ) Notice: Subject to any disclaimer, the term of this patent is extended or adjusted under 35 U.S.C. 154(b) by 393 days.

(21) Appl. No.: 12/411,849

(22) Filed: Mar. 26, 2009

(65) Prior Publication Data

US 2009/0303575 A1 Dec. 10, 2009

(30) Foreign Application Priority Data

Jun. 5, 2008 (CN) .......................... 2008 1 0067655

(51) Int. Cl.
*H04B 10/17* (2006.01)
*H04B 10/12* (2006.01)
(52) U.S. Cl. .............................. 359/341.41; 359/341.42
(58) Field of Classification Search ............. 359/341.41, 359/341.42
See application file for complete search history.

(56) References Cited

U.S. PATENT DOCUMENTS

| | | | |
|---|---|---|---|
| 6,377,394 B1 * | 4/2002 | Drake et al. | 359/341.41 |
| 6,894,832 B1 * | 5/2005 | Aweya et al. | 359/341.41 |
| 6,975,449 B1 * | 12/2005 | Mok et al. | 359/341.41 |
| 7,317,570 B2 * | 1/2008 | McClean et al. | 359/341.41 |
| 7,511,883 B2 * | 3/2009 | Kawahara et al. | 359/341.41 |
| 2001/0043389 A1 * | 11/2001 | Bonnedal et al. | 359/341.41 |
| 2007/0264014 A1 * | 11/2007 | McClean et al. | 398/37 |

* cited by examiner

*Primary Examiner* — Eric Bolda

(57) ABSTRACT

A Self-adapting feed forward control apparatus in an optical amplifier includes a feed forward controller for collecting target output power (Pout) and controlling drive current of a pump laser in the optical amplifier; a feedback controller for calculating target output power (Pt) and collecting actual output power (Pout), calculating deviation between (Pt) and (Pout), and controlling drive current of the pump laser; and a parameter estimator for collecting power target, output power and summation of output signal of the feed forward controller and feedback controller, and estimating the feed forward parameter and updating the parameter of the feed forward controller. The apparatus can automatically correct the feed forward control parameters according to the variation of EDFA parameters due to environmental condition changes or device aging.

7 Claims, 5 Drawing Sheets

SELF-ADAPTING FEED FORWARD CONTROL APPARATUS AND METHOD IN AN OPTICAL AMPLIFIER

BACKGROUND OF THE INVENTION

1. Field of the Invention

The invention is related to high-speed gain control of Erbium-Doped optical Fiber Amplifiers (EDFA), in particular to a method and an apparatus applying self-adapting feed forward control, which can automatically correct the feed forward control parameters according to the variation of EDFA parameters due to environmental condition changes or device aging.

2. Background

In optical-fiber communication systems, the optical fiber amplifier, especially the erbium-doped fiber amplifier (EDFA), has become one of the key parts in optical communication systems. As an EDFA can provide simultaneous amplification for multiple wavelength channels, it greatly accelerates the development of wavelength division multiplexing (WDM) system at low cost over the last decade. However, in dynamically configured WDM systems, random add/drop of channels can take place, which tends to give serious transient effect on the surviving channels for WDM system using EDFAs.

The transient effect mainly results from an abrupt change in the number of channels in WDM system, which gives rise to the cross gain saturation effect on the surviving channels in an EDFA. When the number of channels decreases, the input power to the amplifier is reduced, leading to amplification gain spike of the surviving channels, which can result in bit error rate (BER) increase through optical non-linear effect or receiver overloading. On the other hand, when channels are added, the input power to the amplifier increases, the existing channels will experience a temporary gain decrease, which tends to reduce the signal-to-noise ratio, leading to the BER increase. In order to maintain the transmission performance of the WDM systems using EDFAs in the event of channel add/drop, it is necessary to keep the above transient effect under control. One way to do it is to implement high speed gain control in EDFAs so that the amplifier gain is kept at an approximately constant level with the number of channels being added or dropped.

An effective way to achieve high speed gain control is to use a combination of feed forward and a classic proportional-integral-derivative (PID) feedback control methods.

The feed forward control will adjust the pump power according to the input power change before the gain saturation process takes effect while the feedback control will make fine adjustment to achieve the gain convergence to the gain set point. In this arrangement, the feed forward control brings the amplifier quickly to the pump power set point that is very close to its steady-state target and the feedback PID control based on the error of the output power to its target is more accurate but relatively slow due to finite response time of the gain cross saturation effect. As a result, the degrees of gain over/under shot due to channel add/drop will be dependent on the accuracy of the feed forward control. To certain extend, the relation between the pump power and input signal power at a given gain target can be calibrated when the amplifiers are manufactured. However, this relation can change due to ambient temperature variation or device aging over its life time.

The slope efficiency and threshold of pump laser and the insertion loss of passive components in an EDFA, can change over temperature and over its life time. This is especially true for the un-cooled pump lasers which are sometimes favored due to low power consumption and compact size. Both slope efficiency and threshold of the un-cooled pumps are quite sensitive to operating temperature and can change significantly over time. In general, an EDFA is a time-varying system whose parameters change with time. In general, the calibrated relation between pump and input signal power will become inaccurate over time, which will result in the degraded transient control performance of the amplifier. To overcome this drawback, a self-adaptive feed forward control method can be used to dynamically correct the feed forward accuracy.

SUMMARY OF THE INVENTION

In this invention, a self-adaptive control method to improve transient performance in optical amplifiers is disclosed. The method is implemented by providing a parameter estimator on a conventional feed forward and feedback control system. This parameter estimator can update the control parameters when system parameters changes due to environmental condition changes or device aging. This will ensure that the feed forward control is fast and accurate.

The method in this invention to achieve the above self-adaptive feed forward control includes receiving portion of output power, sampling the bias current of the pump laser, calculating the feed forward error according to the current feed forward value (the pump bias current) and the actual pump bias current (summation of current feed forward value and PID feedback value), estimating more accurate feed forward control parameter and updating feed forward control parameters.

An optional low pass filter placed between feed forward parameter estimator and feed forward controller can also be included in the present invention. This low pass filter will allow the control of the parameter updating speed and filtering out noises.

The advantages of self-adapting feed forward control method in accordance with the present invention are as follows. First of all, it is able to prevent the devices from aging and avoid transient overshoot. For EDFA, the transient performance is an important index. Whether the feedforward parameters are accurate will have an direct effect on the size and time of transient overshoot. If the passive devices and pumping laser are subject to aging, their powers will decrease, feedforward output will be less than the target output, and the transient overshoot will increase. This invention is able to figure out new feedforward parameters according to the errors returned by data collection, so that the renewal feedforward output is more close to the target output, and meanwhile the transient overshoot keeps unchanged.

Furthermore, it is able to protect the sensitive devices from inaccurate feedforward caused by change in temperature or outside disturbance. Such as uncooled pumping laser, its output power is sensitive to temperature variation. Its feedforward parameters are dependent on the temperature. According to the change happening to the system, this invention is able to automatically correct the feedforward parameters to ensure the system an stable performance.

DETAILED DESCRIPTION OF THE INVENTION

Referring to the figures, the following gives a description about self-adapting feed forward control apparatus and method in an optical amplifier in accordance with the present invention. The key part of the method is the feed forward parameter estimator that makes automatic compensation for the feed forward parameters.

Figure 1:
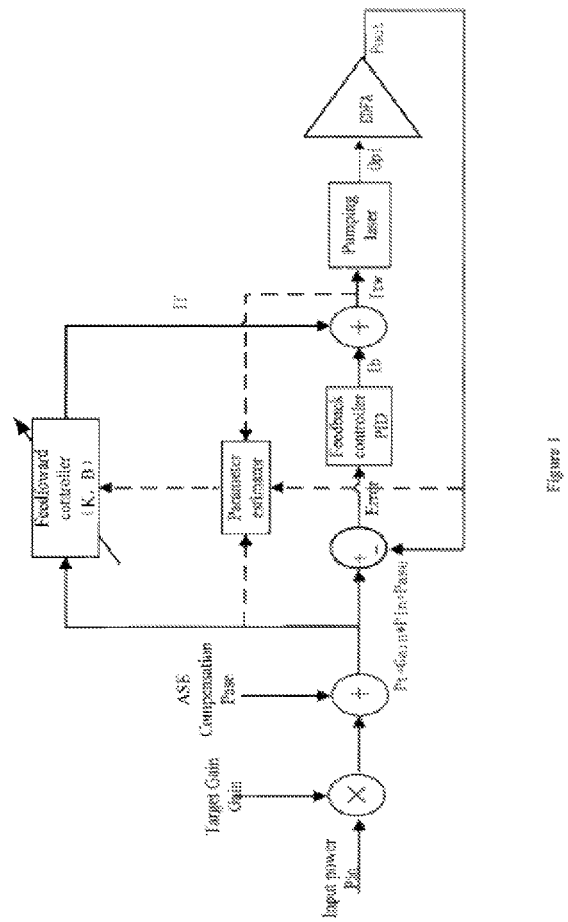
FIG. 1 is a schematic diagram of a self-adapting feed forward control apparatus in an optical amplifier in accordance with one embodiment of the present invention.

First, an introduction to the theoretical basis of the present invention set forth below. As shown in FIG. 1, a controlled EDFA is a time delay system with propagation delay time of typically within 500 ns which can be ignored in the following analysis when comparing with Er carriers life time that is in the order of ms. The data used in the feed forward parameter estimator will be collected when the amplifier is at steady-state, that is, the actual output power is within certain error limit (say, 0.2 dB) to its target power. When EDFA works in a saturation state and the propagation delay time is ignored, the transfer function of EDFA time domain can be expressed as follows:

$$Pout(i) = Pp(i)*ksp + bsp \qquad (1)$$

where Pout is the power of output signal, Pp is the optical pump power in the amplifier and i is the time. At steady state, the actual output power Pout of EDFA is very close to the target output optical power Pt, so we have $$Pout(i) \approx Pt(i) = Gain(i)*Pin(i) + Pase(i) \qquad (2)$$

where Pin is input power, Gain is target gain, and Pase is the amplified spontaneous emissions (ASE) generated by the optical amplifiers, which is linearly proportional to the target gain and can be calibrated at production. In the EDFA that use a combination of feed forward control feedback control, the expression in time domain for the feedback controller can be written as follows:

$$Ib = kp*Error(i) + ki*\Sigma Error(i) + kd*d(Error(i))/dt \qquad (3)$$

where Ib is the pump drive current set point from the feedback controller, kp, ki and kd are the proportional, integral and derivative coefficients respectively. For more stable control, the derivative portion is usually ignored in EDFA control, so PI control mode is adopted. In an EDFA, the output power is linearly proportional to the pump power, so the time domain expression of the feed forward controller can be written as:

$$If(i) = Pt(i)*K(i) + B(i) \qquad (4)$$

where If is the pump drive current set point from the feed forward controller, Pt is the target output power, K and B are feed forward calibration coefficients. In a control system that uses the combination of the feed forward control and feedback control, the overall control set point is the summation of both, namely:

$$Itw(i) = If(i) + Ib(i) \qquad (5)$$

where Itw is the overall control set point of the pump laser. The pump power and its drive current follow a linear relationship:

$$Pp(i) = kpi*Itw(i) + bpi \qquad (6)$$

where kpi is the slope efficiency of the pump laser, and bpi is an offset parameter that defines the threshold current through bpi/kpi.

Based on the equation of (1) and (6), in the presence of both feed forward and feedback control in a controlled EDFA system, the transfer function in the time domain can be simplified as follows:

$$Pout(i) = ((If(i) + Ib(i))*kpi + bpi)*ksp + bsp \qquad (7)$$
$$= (If(i) + Ib(i))*kpi*ksp + bpi*ksp + bsp$$

When the feed forward control set point is accurate, then Ib is equal to 0 in the above equation, thus we have, $$Pout(i) = If(i)*kpi*ksp + bpi*ksp + bsp \qquad (8)$$

At steady state, the actual power is very close to the target, the we have Pout(i)≈Pt(i), By using (4), (8) can be written as, $$If(i) = Pt(i)/(kpi*ksp) - (bpi*ksp - bsp)/(kpi*ksp) \qquad (9)$$

Comparing it with (4), point is obvious that we have $K = 1/(kpi*ksp)$ and $B = -(bpi*ksp - bsp)/(kpi*ksp)$. The linear coefficients K and B are dependent on the pump slope efficiency, threshold and amplifier amplification factor, which may change over its life time. If any of those parameters are changed, the initial feed forward calibration at factory may become inaccurate. The method described below is trying to dynamically correct the feed forward calibration error.

Figure 2:
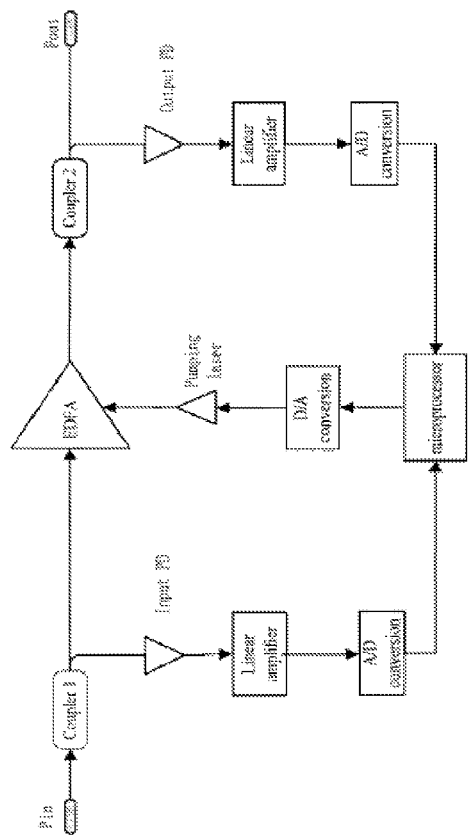
FIG. 2 is a schematic diagram of a self-adapting feed forward control method in an optical amplifier in accordance with the embodiment of the present invention.

Referring to FIG. 2, the control flow without self-adapting correction is described as follows: First, obtain input and output optical power Pin and Pout via PD sampling. Second, work out the feed forward set point based on the input power and power target by using (4). Third, work out the PID feedback set point based on the error between the target power and sampled output power, note that the feed forward and feedback control loops are working in parallel. Finally, combine the feed forward and feedback set points and applied its summation to the pump bias. Note that in the above control scheme, feed forward control is very fast as it can be immediately obtained based on sampled input power. But the feedback control is relatively slow because of the relatively long life time (in the order of ms) of the Erbium ions at the excited states. Therefore the fast transient suppression is mostly relying on the feed forward control. As stated previously, the feed forward set point may become inaccurate due to environmental change and device aging. This will affect the transient over/shoot performance.

Figure 3:
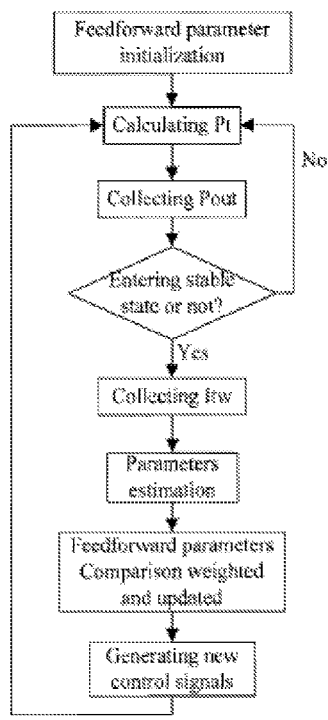
FIG. 3 is a flow diagram illustrating process for self-adapting correction of the feed forward parameters.
Figure 5:
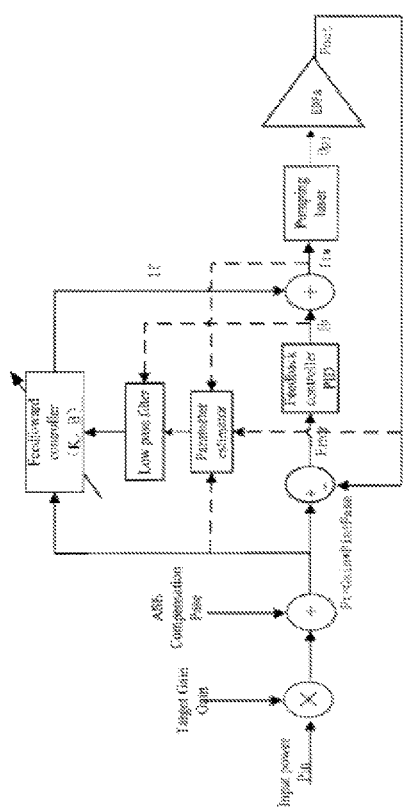
FIG. 5 is a schematic diagram of a self-adapting feed forward control apparatus in an optical amplifier in accordance with another embodiment of the present patent application.

The self-adapting correction of the feed forward parameters proposed in this invention can effectively overcome the above limitation and improve the transient performance. This is achieved by adding a feed forward parameter estimator in the above control loop, as illustrated in FIG. 1. An optional low pass filter could be included to filter out the noise interference, as illustrated in FIG. 5. The algorithm of the self-adapting correction is illustrated in FIG. 3. The basic principle is based on the fact that the correct feed forward current should be equal to the pump overall set point (feed forward+feedback) at steady-state. The algorithm of the parameter estimator is described as follows.

First, obtain the pump set point prediction using (4) when the control loop is at steady-state, say, the output power is within 0.2 dB from the target value:

$$\overline{Iwt(i)} = K*Pout(i) + B \quad (10)$$

Second, the control system continuously records Pout(i) and Iwt(i) values at steady state. Moving average can be applied to the above sampling points to reduce noise and increase stability. A new set of feed forward coefficients K and B can be obtained by minimizing the sum of least squared error of between observation and prediction: $Iwt(i) - \overline{Iwt(i)}$. Taking the derivative with respect to K and B, and setting them to zero $d\epsilon/dK=0$, $d\epsilon/dB=0$, in the below equation $$\varepsilon = \sum_{i=1}^{N} (Iwt(i) - \overline{Iwt(i)})^2 = \sum_{i=1}^{N} [Iwt(i) - (K*Pout(i) + B)]^2 \quad (11)$$

then we have $$2N*B + 2K*\sum_{i=1}^{N} Pout(i) - 2\sum_{i=1}^{N} Itw(i) = 0 \quad (12)$$

$$2K*\sum_{i=1}^{N} Pout(i)^2 - 2B\sum_{i=1}^{N} Pout(i) - 2\sum_{i=1}^{N} Pout(i)*Itw(i) = 0 \quad (13)$$

where N is the number of samples taken. A new set of coefficients K(j) and B(j) can be easily obtained from (12) and (13). To avoid the impact of noise, we can apply a low pass filter by taking a weighted-average between old and new values:

$$K(j) = K(j)*q + K(j-1)*(1-q) \quad (14)$$

$$B(j) = B(j)*q + B(j-1)*(1-q) \quad (15)$$

where q is a parameter between 0 and 1 for controlling the updating rate of the feed forward parameters. A larger q value will result in a faster updating rate.

Figure 4:
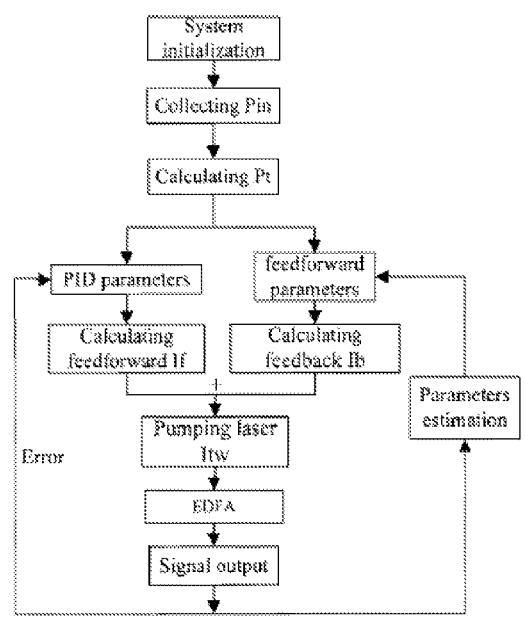
FIG. 4 is a flow diagram illustrating process for self-adapting feed forward control of an optical amplifier.

FIG. 4 illustrates the overall control process that combines a feed forward, feedback PID and a feed forward parameter estimator. It can be implemented based on Micro Control Unit (MCU), Digital Signal Processor (DSP), Field-Programable Gate Array (FPGA) or combination of those devises. The control scheme includes the following steps:

initializing system parameters, starting from previous feed forward calibration parameters;

gathering input and output power through AD sampling;

working out the target output power for given gain target taking ASE power into consideration;

calculating the PID feedback set point based on the output power error from the target;

working out the feed forward set point based on previous feed forward control coefficients;

adding up both feed forward and feedback set points and apply it to pump bias; and updating a new set of feed forward parameters if the control loop is at steady-state.

What is claimed is:

1. A Self-adapting feed forward control apparatus in an optical amplifier comprising:

a feed forward controller for collecting a target output power (Pt) and controlling drive current of a pump laser in the optical amplifier;

a feedback controller for collecting the target output power (Pt) and an actual output power (Pout), calculating a deviation between the target output power (Pt) and the actual output power (Pout), and controlling the drive current of the pump laser; and a parameter estimator for collecting the target output power (Pt), the actual output power (Pout) and a summation of output signals of the feed forward controller and the feedback controller, and estimating a feed forward parameter and updating the feed forward parameter of the feed forward controller.

2. The apparatus in claim 1 further comprising a low pass filter placed between the feed forward controller and the parameter estimator for controlling the updating rate of the feed forward parameters.

3. The apparatus in claim 1, wherein the optical amplifier is an Erbium-doped optical fiber amplifier, a Thulium-doped optical fiber amplifier, or a Ytterbium-Erbium co-doped optical fiber amplifier.

4. A Self-adapting feed forward control method in an optical amplifier comprising steps of:

collecting an input power (Pin) by a feed forward controller;

accessing a target gain Gain;

calculating a target output power (Pt) according to a formula:

Pt=Pin*Gain+Pase, where Pase is the amplified spontaneous emission (ASE) generated by the optical amplifier;

accessing an output (If) of the feed forward controller combined with a feedback control by a feedback controller;

accessing an output (Ib) of a PID controller;

collecting an actual output power (Pout) of the optical amplifier;

calculating a deviation between the target output power (Pt) and the actual output power (Pout) to determine if the optical amplifier is at steady-state, if so, then inputting the actual output power (Pout) and an overall control set point (Itw) of a pump laser of the optical amplifier into a parameter estimator by means of moving average algorithm;

calculating an estimated feed forward parameter according to the data in the parameter estimator by a least square method; and calculating a new feed forward parameter by weighting the estimated feed forward parameters and the former feed forward parameters.

5. The method of claim 4, wherein the output of the feed forward controller is a linear function of the target output power with its feed forward parameters comprising the feed forward calibration coefficients K and B.

6. The method of claim 4, wherein the method further comprising the step of controlling the updating rate of the feed forward parameters by a low pass filter placed between the feed forward controller and the parameter estimator.

7. The method of claim 4, wherein the optical amplifier is an Erbium-doped optical fiber amplifier, a Thulium-doped optical fiber amplifier, or a Ytterbium-Erbium co-doped optical fiber amplifier.

* * * * *